(12) United States Patent
Watanabe et al.

(10) Patent No.: US 7,918,594 B2
(45) Date of Patent: Apr. 5, 2011

(54) AUTOMOTIVE HEADLAMP APPARATUS AND METHOD OF CONTROLLING AUTOMOTIVE HEADLAMP APPARATUS WHERE HIGH BEAM ILLUMINATION AREA IS CONTROLLED

(75) Inventors: Takao Watanabe, Shizuoka (JP); Satoshi Yamamura, Shizuoka (JP)

(73) Assignee: Koito Manufacturing Co., Ltd, Tokyo (JP)

( * ) Notice: Subject to any disclaimer, the term of this patent is extended or adjusted under 35 U.S.C. 154(b) by 66 days.

(21) Appl. No.: 12/361,471

(22) Filed: Jan. 28, 2009

(65) Prior Publication Data

US 2009/0190323 A1    Jul. 30, 2009

(30) Foreign Application Priority Data

Jan. 29, 2008    (JP) .................................. 2008-018378

(51) Int. Cl.
*B60Q 1/04* (2006.01)
(52) U.S. Cl. ........ 362/507; 362/545; 362/543; 362/464; 362/465; 362/466
(58) Field of Classification Search .......... 362/464–466, 362/507, 543–545
See application file for complete search history.

(56) References Cited

U.S. PATENT DOCUMENTS

| 6,565,247 | B2 | 5/2003 | Thominet |
| 7,281,832 | B2* | 10/2007 | Ishida et al. .................. 362/544 |
| 7,690,826 | B2* | 4/2010 | Kim ............................... 362/545 |
| 2006/0146552 | A1* | 7/2006 | Shaffer ........................ 362/465 |
| 2008/0205072 | A1* | 8/2008 | Chretien ....................... 362/466 |

FOREIGN PATENT DOCUMENTS

JP    2001266620    9/2001

OTHER PUBLICATIONS

The First Office Action from Chinese Patent application No. 200910203902.4, Original document, dated Dec. 29, 2010, 4 pages.
The First Office Action from Chinese Patent application No. 200910203902.4, Translated document, dated Dec. 29, 2010, 6 pages.

* cited by examiner

*Primary Examiner* — Anabel M Ton
(74) *Attorney, Agent, or Firm* — Fulwider Patton LLP

(57) ABSTRACT

An automotive headlamp apparatus is provided with a light source for producing a high beam and a controller for controlling illumination from the light source. Given that at least a portion of a high beam illumination area illuminated by the light source is vertically divided into a plurality of blocks, the controller controls illumination from the light source such that a plurality of first regions having a predetermined horizontal width are formed at least in some of the blocks toward the bottom, and that a second region having a greater horizontal width than the first regions is formed in the block toward the top.

16 Claims, 11 Drawing Sheets

AUTOMOTIVE HEADLAMP APPARATUS AND METHOD OF CONTROLLING AUTOMOTIVE HEADLAMP APPARATUS WHERE HIGH BEAM ILLUMINATION AREA IS CONTROLLED

CROSS-REFERENCES TO RELATED APPLICATIONS

This application claims priority from Japanese Application No. 2008-018378, filed Jan. 29, 2008.

BACKGROUND OF THE INVENTION

1. Field of the Invention

The present invention relates to an automotive headlamp apparatus and a method of controlling an automotive headlamp apparatus, and, more particularly, to illumination control using a light source for high beam illumination.

2. Description of the Related Art

Generally, an automotive headlamp apparatus is provided with a light source for high beam illumination used for emitting an upper beam and a light source for low beam illumination for emitting a lower beam. Of these, a high beam is required to provide distant illumination with the maximum brightness permitted within the brightness range defined in the relevant law. Meanwhile, care should be taken so that oncoming vehicles, vehicles in front, or pedestrians do not experience an uncomfortable glare. A low beam forms a light distribution pattern that allows for reduction of glare. A high beam, on the other hand, forms a light distribution pattern that gives priority to ensuring a field of view for the driver and does not allow for reduction of glare as much. In this regard, an automotive headlamp apparatus is provided with a switch for switching between the low beam mode and the high beam mode. The driver selects one of the beam modes depending on whether there are oncoming vehicles or pedestrians, indicating whether to give priority to securing the field of view by using the low beam light source and the high beam light source or to prevention of glare by using only the low beam light source.

There is also proposed an automotive headlamp apparatus in which a single lamp unit forms a plurality of light distribution patterns. For example, the illumination device disclosed in JP 2001-266620 is provided with a large number of semiconductor light sources arranged in a matrix. The large number of semiconductor light sources are individually controllable and form different partial regions. The semiconductor light sources are individually controlled as needed to form a desired light distribution pattern and allow switching between the low beam mode and the high beam mode.

For example, drivers use a high beam because they feel that information indicating the pattern of the road far ahead, whether there are obstacles, or whether there are oncoming vehicles or pedestrians is not sufficient only by using a low beam while driving at night and so aim to obtain as much information as possible. Meanwhile, care should be taken not to let oncoming vehicles, vehicles in front, or pedestrians experience a glare. As mentioned before, the related-art headlamp apparatus is configured to entirely turn off a high beam light source in order to reduce a glare. In this case, the function of a high beam is temporarily prevented from being exhibited. We have come to be aware that there is a room for improvement in view of the driver's need for a sufficient field of view. Having to entirely turn on and off a high beam also makes drivers reluctant to use it on city streets.

The illumination device disclosed in JP 2001-26620 is capable of forming a plurality of light distribution patterns using a large number of semiconductor light sources arranged in a matrix and so is capable of more meticulous illumination control than just turning on and off a high beam. However, the illumination device disclosed in JP 2001-26620 requires controlling a large number of semiconductor light sources individually to form partial regions that define desired light distribution patterns. Accordingly, the number of control lines would be enormous and control would become complicated. Moreover, requirement for a large number of semiconductor light sources results in an increase in the cost for components and complexity of assembly.

SUMMARY OF THE INVENTION

The present invention addresses the aforementioned problem and the general purpose thereof is to provide an automotive headlamp apparatus having a simple structure whereby illumination is controlled such that oncoming vehicles, vehicles in front, or pedestrians do not experience a glare while a high beam is being emitted, and a sufficient field view is enjoyed using a high beam.

In order to address the problem, at least one embodiment of the present invention provides an automotive headlamp apparatus comprising a light source for producing a high beam; and a controller for controlling the illumination from the light source, wherein, given that at least a portion of a high beam illumination area illuminated by the light source is vertically divided into a plurality of blocks, the controller controls illumination from the light source such that a plurality of first regions having a predetermined horizontal width are formed at least in some of the blocks toward the bottom, and that a second region having a greater horizontal width than the first regions is formed in the block toward the top.

In order to address the problem, at least one embodiment of the present invention provides a method of controlling an automotive headlamp apparatus for controlling illumination from a light source for producing a high beam, comprising: vertically dividing at least a portion of a high beam illumination area illuminated by the light source into a plurality of blocks; controlling illumination from the light source such that a plurality of first regions having a predetermined horizontal width are formed at least in some of the blocks toward the bottom, and that a second region having a greater horizontal width than the first regions is formed in the block toward the top; and, when an object that requires reduced illumination is found in the high beam illumination area, the portion of the high beam illumination area corresponding to the location occupied by the object is turned off.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
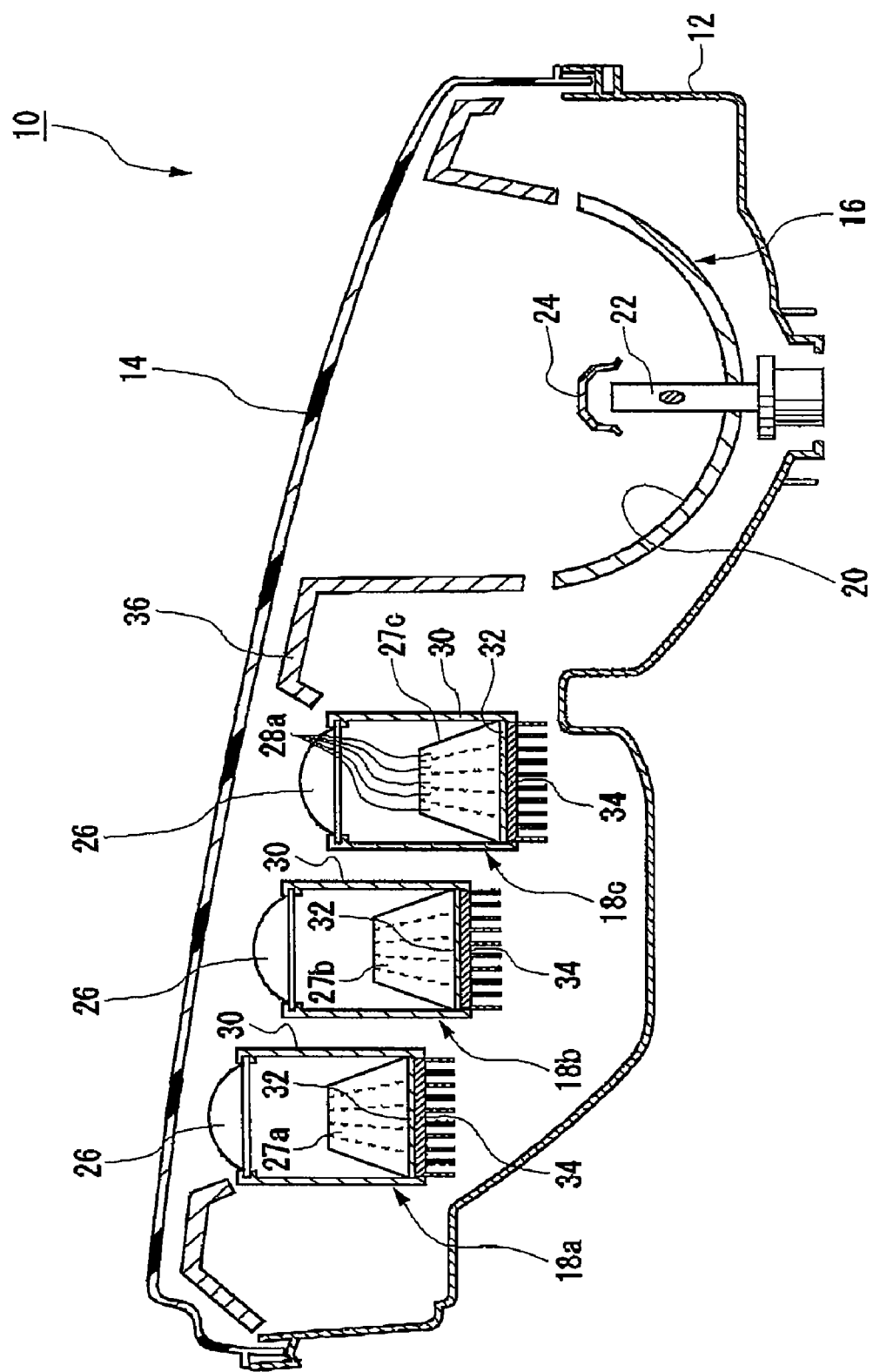
FIG. 1 is a schematic diagram showing the structure of an automotive headlamp apparatus according to the embodiment.

The invention will now be described by reference to the preferred embodiments. This does not intend to limit the scope of the present invention, but to exemplify the invention.

A description will be given, with reference to the drawings, of an embodiment embodying the present invention.

The automotive headlamp apparatus according to the embodiment is provided with a light source for producing a high beam and a controller for controlling the illumination from the light source. Given that at least a portion of a high beam illumination area illuminated by the light source is vertically divided into a plurality of horizontally extending blocks (hereinafter, referred to as blocks), illumination is controlled such that a plurality of first regions having a predetermined horizontal width are formed at least in some of the blocks toward the bottom, and that second regions having a greater horizontal width than the first regions are formed in the block toward the top.

Lamps of various types including halogen lamps, discharge lamps, and semiconductor light emitting devices may be used as the high beam light source. The controller may simply turn on and off the light source or controls the amount of light in addition to on and off control. Given that at least a portion of a high beam illumination area is vertically divided into a plurality of blocks, the controller forms first regions having a predetermined horizontal width at least in some of the blocks toward the bottom. The number of vertical partitions will be arbitrary so long as at least two partitions are provided. The high beam illumination area may be vertically divided over the entirety of its width. Alternatively, a portion of the area may be divided. When a portion is divided, it is desired that the vicinity of the center of the high beam illumination area be included in the partitioned regions. Preferably, "a predetermined width" is equal to or greater than the minimum width that can viably represent an illumination area of a headlamp apparatus. The minimum width may be defined as a width capable of illuminating a vertical screen set up at the distance of 100 m in front with a width having substantially equal to the width of a passenger vehicle located at the distance of 100 m in front on a traffic road.

The controller also forms second regions having a greater horizontal width than the first regions in the block toward the top of the high beam illumination area. One of the things to be considered in illumination control by the controller is to ensure that oncoming vehicles, vehicles in front, or pedestrians do not experience a glare, for example. This consideration is particularly necessary in high-beam illumination. We have repeated experiments and found that oncoming vehicles or pedestrians approaching from far ahead are located in the vicinity of the horizontal line, i.e., toward the bottom of the high beam illumination area. Similarly, vehicles running in front are generally found to be located in the vicinity of the horizontal line. As the oncoming vehicle traveling in left-hand traffic approaches the driver's vehicle, the vehicle is displaced rightward along the horizontal line from the intersection, on the hypothetical vertical screen, of the vertical line and the horizontal line. The degree of displacement becomes higher, as the vehicle approaches the driver's vehicle. In other words, given that a high beam illumination area is vertically divided into a plurality of blocks, the high beam illumination area in which reduction of glare should be of concern would be a block or blocks located toward the bottom. Therefore, glare, as experienced by oncoming vehicles, vehicles in front, or pedestrians moving relative to the driver's vehicle, can be reduced in an easy and meticulous manner, by exercising illumination control whereby a plurality of first regions, which are formed in blocks toward the bottom of the high beam illumination area and in which oncoming vehicles, vehicles in front, or pedestrians are likely to be located, are individually turned off. Since the horizontal width of the first region is relatively small, such control does not unduly restrict the extent of the high beam illumination area. Consequently, a sufficiently large high beam illumination area is secured so that the driver can enjoy a field of view, even if illumination control whereby lamps are selectively turned off for reduction of glare is performed.

Oncoming vehicles, vehicles in front, or pedestrians are less likely to be found in the upper blocks of the high beam illumination area and so need not be controlled to be turned on and off frequently. In this regard, the controller forms the second regions toward the top of the high beam illumination area such that the second regions have a greater width than the first regions in blocks. This ensures that the number of partitions into regions toward the top of the high beam illumination area is smaller than the number of partitions into regions toward the bottom so that illumination control is simplified. The number of control lines for controlling light source for forming the second regions is also reduced so that the structure of the automotive headlamp apparatus is simplified. This will also facilitate reduction of the number of components.

FIG. 1 is a schematic diagram showing the structure of an automotive headlamp apparatus 10 according to the embodiment. As shown in FIG. 1, a lamp body 12 and a transparent cover 14 of an automotive headlamp apparatus 10 form a substantially sealed space. Inside the space are provided a low beam lamp unit 16 and a plurality of high beam lamp units 18a, 18b, and 18c. Since the basic structures of the high beam lamp units 18a, 18b, and 18c are substantially the same, the units may be referred to as high beam lamp units 18 if there is no need to distinguish between the units individually or if plural units are referred to. In the case of the embodiment, three high beam lamp units 18 are provided by way of example. A hypothetical vertical screen located on a traffic road at the distance of 25 m ahead and including a vertical line V and a horizontal line H will be considered. The illumination areas formed by the low beam lamp unit 16 and the high beam lamp units 18 are projected as light distribution patterns on the hypothetical vertical screen. Specific light distribution patterns formed by the low beam lamp unit 16 and the high beam lamp units 18 will be described later.

The low beam lamp unit 16 is a parabola lamp unit having a reflector 20 formed by using a paraboloid of revolution as a reference. In the case of FIG. 1, the low beam lamp unit 16 is provided more toward the side of the vehicle than the high beam lamp units 18. For example, incandescent lamps, halogen lamps, discharge lamps, LEDs, neon tubes, and laser light sources may be used as light sources for the headlamp. In this embodiment, a bulb 22 embodied by a halogen lamp is shown by way of example. The bulb 22 is fastened to an opening formed substantially at the center of the reflector 20 and is supported by the lamp body 12. The low beam lamp unit 16 may be provided with an light axis adjustment mechanism (not shown) so that the light axis is adjusted depending on the orientation of the vehicle. A shade 24 is provided in front of the bulb 22. The shade 24 has the function of cutting direct light projected forward from the bulb 22 and eliminates the cause that let oncoming vehicles, vehicles in front, or pedestrians experience uncomfortable glare. The shade 24 may be secured to the reflector 20 by using a supporting member such as a bracket. Instead of providing the shade 24, a mask may be formed by treating the surface of the end of the bulb 22 so that the mask provides the same function as the shade 24.

In the case of the low beam lamp unit 16, a distinct bright-dark border, i.e., a so-called cut-off line, is provided that defines the upper limit of the light distribution. The cut-off line marks a border between a bright area below the cut-off line and a dark area above the cut-off line. The cut-off line used in, for example, an area with left-hand traffic includes a right portion, a central portion, and a left portion. The right portion, extending horizontally on the right side of the vehicle below the horizontal line passing through the light axis, and the left portion, extending horizontally on the left side of the vehicle slightly above the right portion, are joined by the central portion inclined upward to the left. The inclination of the central portion is, for example, 45°. In the case of the parabola lamp unit as shown in FIG. 1, a shade for forming a cut-off line may be built in the bulb 22. In the case of a projector lamp unit having a convex lens in front of a light source, a shade for forming a cut-off line is provided between the reflector and the convex lens so that the shape of the end of the shade is projected onto the hypothetical vertical screen.

In the case of the embodiment, the plurality of high beam lamp units 18*a*, 18*b*, and 18*c* are provided more toward the center of the vehicle than the low beam lamp unit 16. The high beam illumination area is formed by combining illumination areas irradiated by light emitted by the high beam lamp units 18*a*, 18*b*, and 18*c* so as to form a predetermined light distribution pattern on the hypothetical vertical screen. As mentioned before, the basic structures of the high beam lamp units 18*a*, 18*b*, and 18*c* are substantially the same. Therefore, the structure will be explained by taking the high beam lamp unit 18*a* as an example. Light source units 27 included in the high beam lamp unit 18 have the same basic structures, the difference being in the shape, position, and number of front end beam outlets 28*b*. Therefore, the units will be referred to as light source units 27*a*, 27*b*, and 27*c* if distinction is required. Otherwise, the units may be referred to as light source units 27.

The high beam lamp unit 18*a* comprises a projection lens 26, a light source unit 27*a*, and a holder 30. The high beam lamp unit 18*a*, which includes the light source unit 27*a*, is configured to bend a light path 28*a* formed inside the light source unit 27*a* a plurality of times to ensure that light is reflected a plurality of times before being transmitted through the light path 28*a*, thereby ensuring uniform brightness of the light emitted. The lamp unit of this type may be referred to as a reflection type projector lamp unit.

The projection lens 26 is provided on a light axis extending in the longitudinal direction of the vehicle. The light source unit 27*a* is provided behind the back focal plane including the back focal point of the projection lens 26. The holder 30 supports the projection lens 26 and the light source unit 27*a* and is secured to the lamp body 12 using a bracket (not shown). The high beam lamp unit 18*a* may be provided with a light axis adjustment mechanism for adjusting the light axis.

The projection lens 26 is embodied by a planoconvex aspheric lens having a convex front surface and a planar back surface. The lens 26 projects an image of a light source formed on the back focal plane onto the hypothetical vertical screen in front of the lamp as an inverted image.

Inside the light source unit 27*a* are formed a plurality of light paths 28*a* which are, for example, mirror-finished. A plurality of light emitting devices are provided as individual light sources on a device substrate 32 provided in the vicinity of the rear end of the light source unit 27*a*, originating the light paths 28*a*. The light from each light emitting device is directed to the front end beam outlet formed at the front end of the light source unit 27*a* and emitted toward the projection lens 26. The structure of the front end beam outlet will be described later. A heat sink plate 34 is provided on the back of the device substrate 32 provided in the vicinity of the rear end of the light source unit 27*a* so that heat generated as a result of driving the light emitting devices is efficiently dissipated. By configuring the first regions and second regions using individual light sources, it is ensured that only as many power supply lines and signal lines as there are first regions and second regions need be provided. Thus, the structure of light sources and control thereof are simplified accordingly. While FIG. 1 shows a single, large device substrate 32, there may be provided individual device substrates for carrying light emitting devices embodying individual light sources corresponding to respective light paths 28*a*.

In addition, an extension 36 for improving the front appearance of the headlamp is provided in the automotive headlamp apparatus 10. The extension 36 is a substantially box-shaped member provided to cover a gap between the low beam lamp unit 16 and the lamp body 12, a gap between the high-low gap and the lamp body 12, and a gap between the high beam lamp unit 18 and the lamp body 12. The extension 36 usually has a reflecting surface.

Figure 2A:
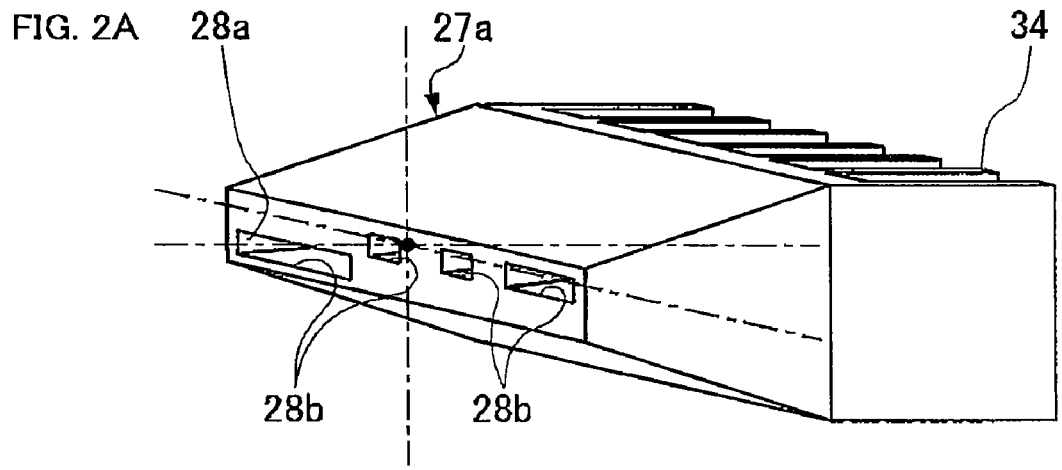
FIGS. 2A-2C are perspective views illustrating the appearance of light source units of the automotive headlamp apparatus according to the embodiment, the layout of light paths, and the shape of front end beam outlets formed at the end of the light path.
Figure 2B:
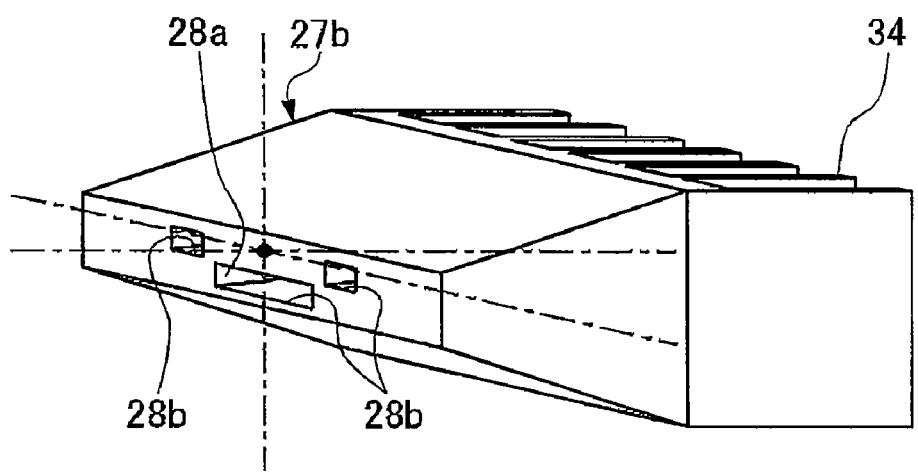
Figure 2C:
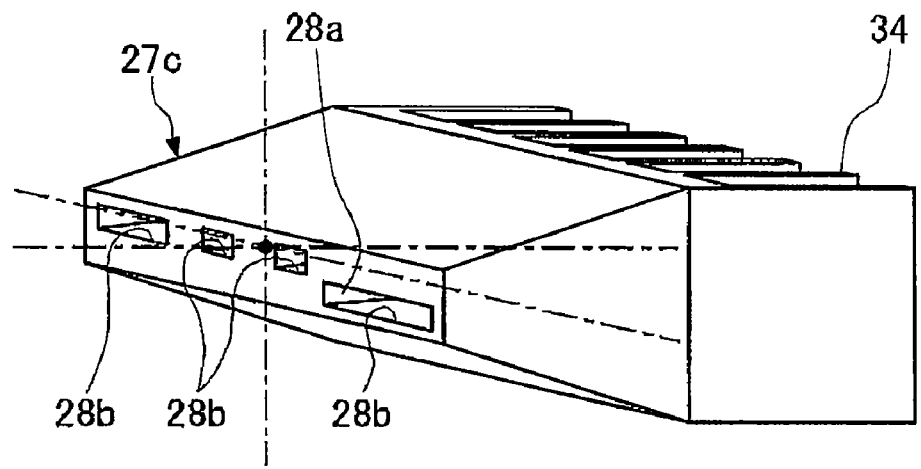

FIGS. 2A-2C are perspective views illustrating the appearance of the light source units 27*a*, 27*b*, and 27*c*, the layout of the light paths 28*a*, and the shape of the front end beam outlets 28*b* formed at the front end of the light paths 28*a*. In each light path 28*a* is provided a light emitting device as an individual light source. Each light emitting device is controlled to be turned on and off. As mentioned before, in the case of the embodiment, the light emitted by the three high beam lamp units 18*a*, 18*b*, and 18*c*, i.e., from the light source units 27*a*, 27*b*, and 27*c* is combined so as to form a desired high beam illumination area and form the light distribution pattern on the hypothetical vertical screen.

Figure 3A:
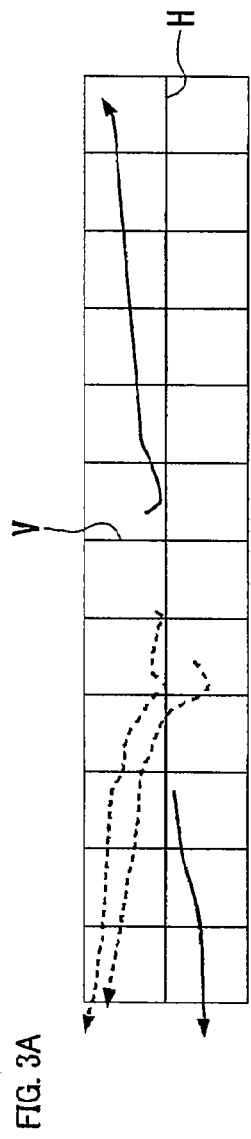
FIGS. 3A-3D show the eye movement of a driver driving a vehicle.
Figure 3B:
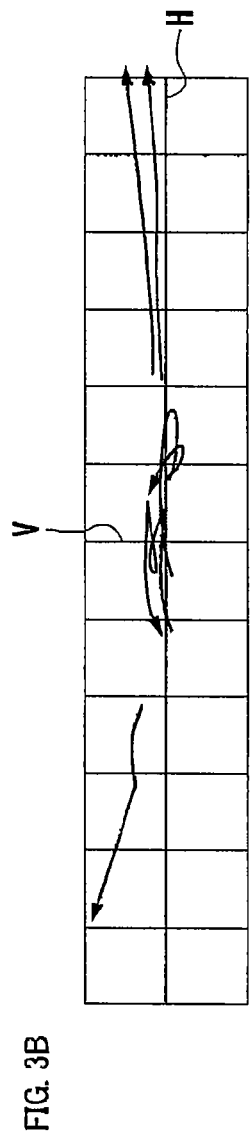
Figure 3C:
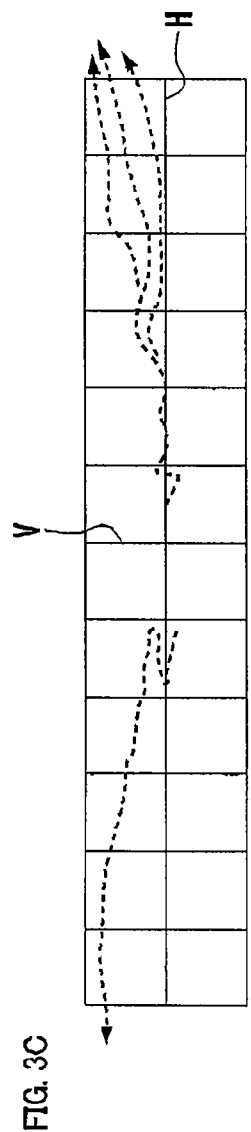
Figure 3D:
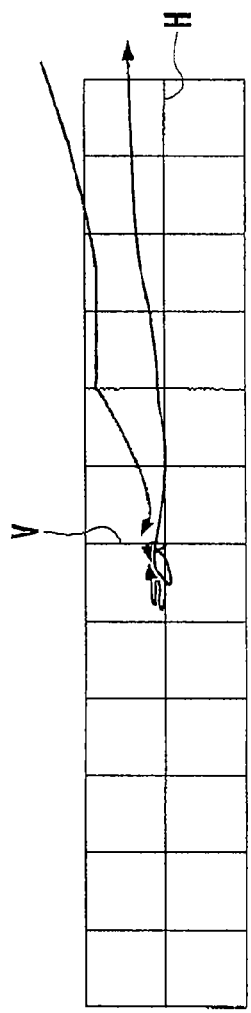

We have conducted experiments to track the movement of the eyes of a driver driving a vehicle and found that the characteristic movement as shown in FIGS. 3A-3D is exhibited. FIGS. 3A-3C show the eye movement on a hypothetical vertical screen set up in front of a vehicle driving on city streets in an area with left-hand traffic, where solid lines indicate the movement of eyes as the driver detects an oncoming vehicle and broken lines indicate the movement of eyes as the driver detects a pedestrian. It will be noted that an oncoming vehicle or pedestrian approaching from far ahead is first noticed at the intersection of the vertical line V and the horizontal line H on the hypothetical vertical screen. The eyes that catch an oncoming vehicle traveling in left-hand traffic will move upward to the right along the horizontal line H as the oncoming vehicle approaches the driver's vehicle. The eyes that catch a vehicle located to the left of the driver's vehicle (e.g., a vehicle parked on a roadside) or a pedestrian located on a roadside to the left or on a sidewalk move upward to the left along the horizontal line H as the vehicle or the pedestrian approaches the driver's vehicle. FIG. 3D shows the movement of eyes catching an oncoming vehicle as the driver is driving on a highway. In this case, the eyes of the driver also move upward to the right along the horizontal line H as the oncoming vehicle approaches the driver's vehicle. Since the vehicle in front remains in the vicinity of the intersection of the vertical line V and the horizontal line H, the eyes catching the vehicle in front remain relatively static around the intersection of the vertical line V and the horizontal line H.

Accordingly, to ensure that oncoming vehicles, vehicles in front, or pedestrians do not experience a glare when the high beam lamp unit 18 is turned on, the lower portion of the high beam illumination area in the vicinity of the horizontal line H need be meticulously controlled to be turned on and off in adaptation to the movement of an oncoming vehicle or a pedestrian. We have also found that the upper portion of the high beam illumination area need only be subject to simple on and off control, or the high beam may remain turned on, because oncoming vehicles, pedestrians, or the like are less likely to be found in the upper portion.

Thus, according to the embodiment, at least a portion of the high beam illumination area irradiated by the light emitted by the high beam lamp units 18 is vertically divided into a plurality of bocks. A plurality of first regions having a predetermined horizontal width are formed at least in some of the plurality of blocks produced by division toward the bottom, and second regions having a greater horizontal width than the first regions are formed in the block toward the top so that the regions are subject to individual illumination control. More specifically, the lower blocks of the high beam illumination area, in which oncoming vehicles or pedestrians are likely to be found, are subject to illumination control whereby the first regions having a smaller width are frequently turned on and off in adaptation to the movement of the oncoming vehicle or pedestrian, so that glare is not experienced less. By thus subjecting the first regions having a smaller width to on and off control and minimizing the number of regions turned off, a sufficient field of view is secured for the driver while a high beam is being turned on. The second regions having a greater width than the first regions are formed in a block toward the top where oncoming vehicles or pedestrians are less likely to be found. Thus, by performing illumination control so that the second regions have a greater horizontal width than the first regions, the number of divisions in the high beam illumination area in the width direction is ensured to be smaller than that of blocks toward the bottom. As a result, a large high beam illumination area is formed using simple illumination control so that a large area is illuminated by a high beam. As a result, a sufficient field of view is secured for the driver. Since the number of light sources subject to control is reduced, the number of power supply lines and control lines is reduced and the structure of the high beam lamp unit 18 is simplified accordingly. The light sources forming the first region may produce the same amount of light as those of the second regions. Alternatively, light sources dedicated to the respective regions may be used. Since the second regions have a larger width than the first regions, the associated brightness on the hypothetical screen would be lower if the light sources producing the same amount of light are used. However, brightness sufficient to notice traffic signs will still be provided.

A description will be given, with reference to FIGS. 2A-2C, of the structure of the light source units 27a, 27b, and 27c that allow illumination control for forming the first and second regions subject to individual on and off control as described above. In the case of FIGS. 2A-2C, for formation of the first and second regions in two vertically separated blocks, a plurality of front end beam outlets 28b are provided in the light source units 27a, 27b, and 27c, forming a plurality of blocks in the vertical direction. The light paths 28a that direct the light forming the first and second regions are isolated from each other by partitions so as to ensure that individual regions are clearly defined. It is not desirable, however, if a shadow produced by the partitions presents itself in the high beam illumination area produced by the combination of regions, because it would result in poorer quality of illumination. As shown in FIGS. 2A-2C, this is addressed by providing the front end beam outlets 28b of the individual light source units 27a, 27b, and 27c such that the outlets 28b are not in contact with each other horizontally or vertically. Further, by fine tuning the light axes of the light source units 27a, 27b, and 27c, the shadow portion produced by a given one of light source units 27a, 27b, and 27c is canceled by the light from the front beam outlet 28b of another of the light source units 27a, 27b, and 27c. In other words, a high beam illumination area is formed such that the shadow of the light paths 28a is not reflected in the combined light from the three light source units 27a, 27b, and 27c.

Figure 4A:
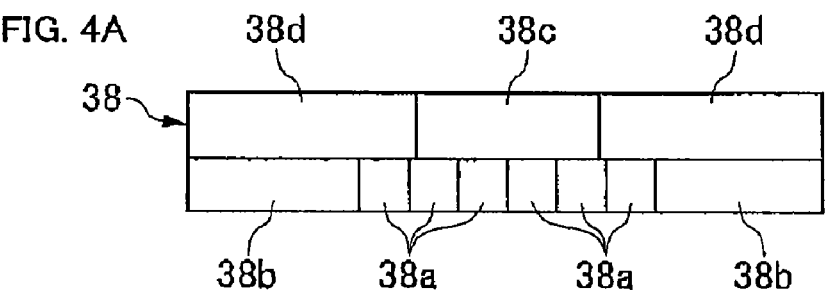
FIGS. 4A-4D show how light from the light source units of the automotive headlamp apparatus according to the embodiment is combined.

FIGS. 4A-4D show how the light from the light source units 27a, 27b, and 27c shown in FIGS. 2A-2C is combined. FIGS. 4A-4D illustrate an example of forming a high beam illumination area by combining individual illumination areas formed by the three high beam lamp units 18, i.e., the light source units 27a, 27b, and 27c. The high beam illumination area is divided into two vertically separated blocks. The horizontal width of each of the second regions in the upper block is greater than the horizontal width of each of the first regions in the lower block. The horizontal width of the first region may be defined as a width capable of illuminating a vertical screen set up at the distance of 100 m in front with a width having substantially equal to width of a passenger vehicle located at the distance of 100 m in front on a traffic road. FIG. 4A shows a high beam illumination area 38 produced when the three high beam lamp units 18 are entirely turned on. Referring to FIG. 4A, first regions 38a and 38b are formed in the lower block. As mentioned before, the lower portion of the high beam illumination area 38 is in the vicinity of the horizontal line H on the hypothetical vertical screen and is characterized by greater likelihood that oncoming vehicles or pedestrians are found. Therefore, the first regions 38a having a smaller width are subject to meticulous on and off illumination control. Referring also to FIG. 4A, second regions 38c and 38d are formed in the upper block. As mentioned before, the upper portion of the high beam illumination area 38 is away from the horizontal line H on the hypothetical vertical screen and is characterized by less likelihood that oncoming vehicles or pedestrians are found. Therefore, the second regions are formed with a greater horizontal width than the first regions to allow simple on and off illumination control. In other words, by using the second regions 38c and 38d for illumination, the chance of securing a sufficient field of view in front is increased by using a part of the high beam function.

Figure 4B:
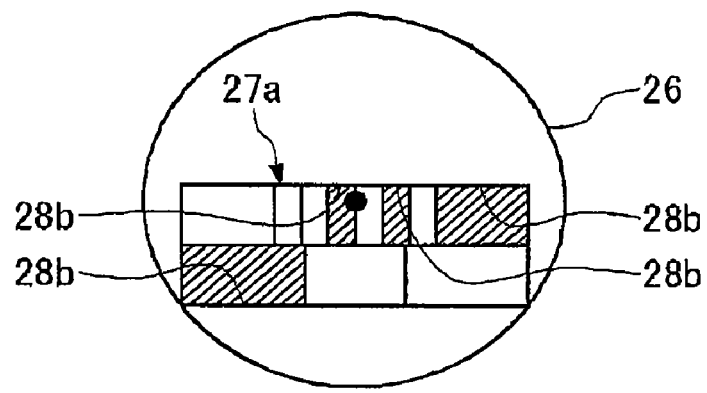
Figure 4C:
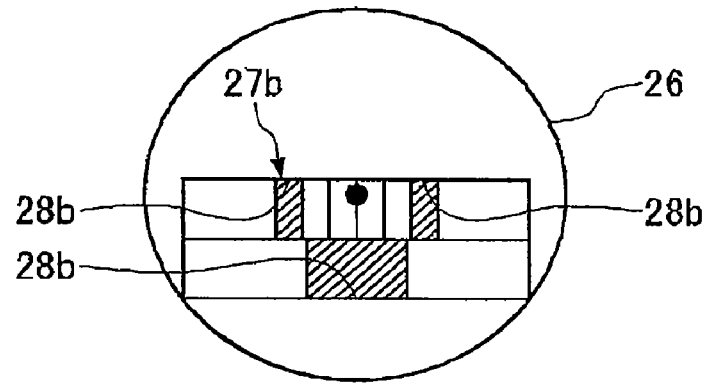
Figure 4D:
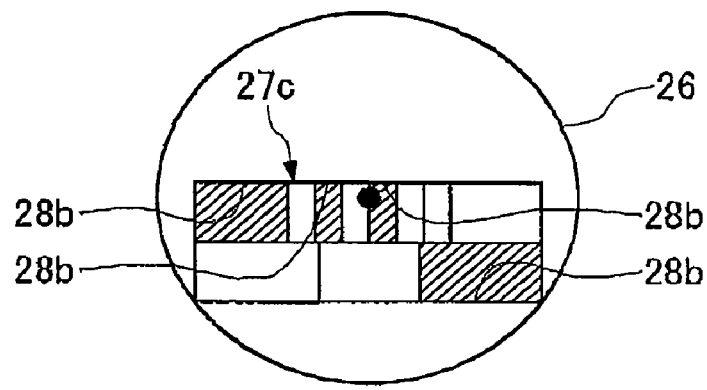

FIGS. 4B-4D illustrate the shape and location of the front end beam outlets 28b in the light source units 27a, 27b, and 27c. Since the projection lens 26 embodied by a planoconvex aspheric lens is provided in front of the light source units 27a, 27b, and 27c, the image projected by the projection lens 26 through the high beam illumination area is inverted on the hypothetical vertical screen. Therefore, the front end beam outlets 28b are provided in the light source units 27a, 27b, and 27c such that the front end beam outlets 28b forming the second regions are provided in the lower block and the front end outlets 28b forming the first regions are provided in the upper block. Referring to FIGS. 4B-4D, the shaded parts represent parts formed with the front end beam outlets 28b and the other parts are formed with a cover. Since the light source units 27a, 27b, and 27c are located lower than the center of the projection lens 26 in the vertical direction, the high beam light distribution pattern formed on the hypothetical vertical screen by projection from the high beam illumination area is located above the horizontal line H.

Figure 5A:
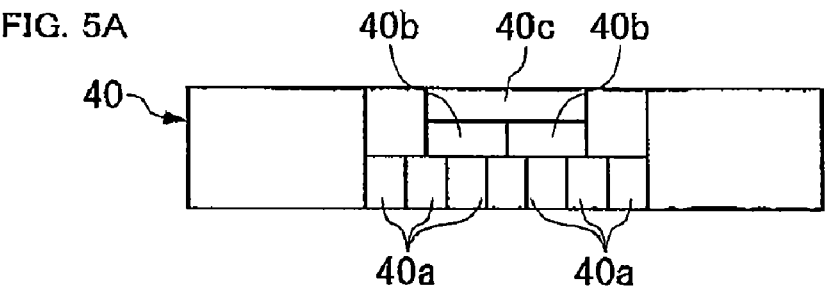
FIGS. 5A-5D show how light from the light source units of the automotive headlamp apparatus according to the embodiment is combined.
Figure 5B:
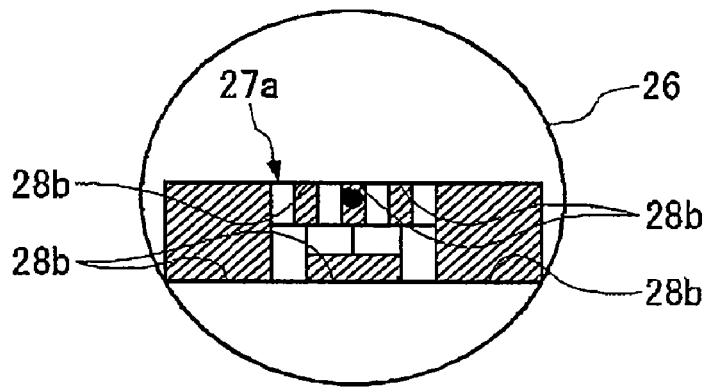
Figure 5C:
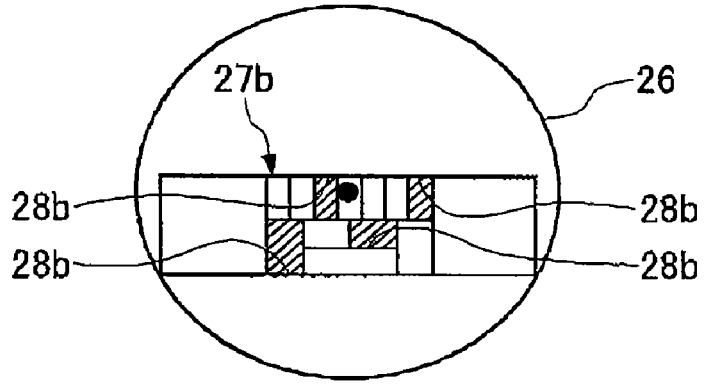
Figure 5D:
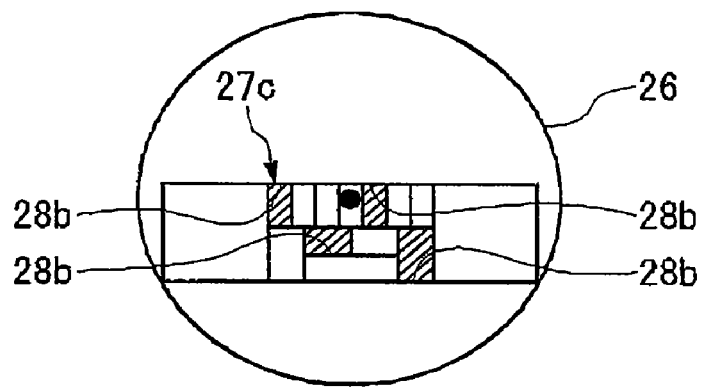
Figure 6A:
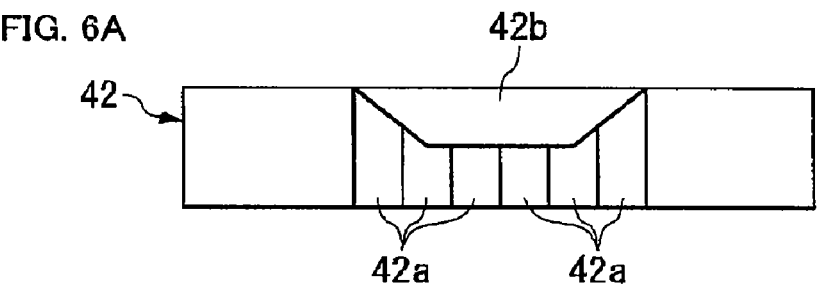
FIGS. 6A-6D show how light from the light source units of the automotive headlamp apparatus according to the embodiment is combined.
Figure 6B:
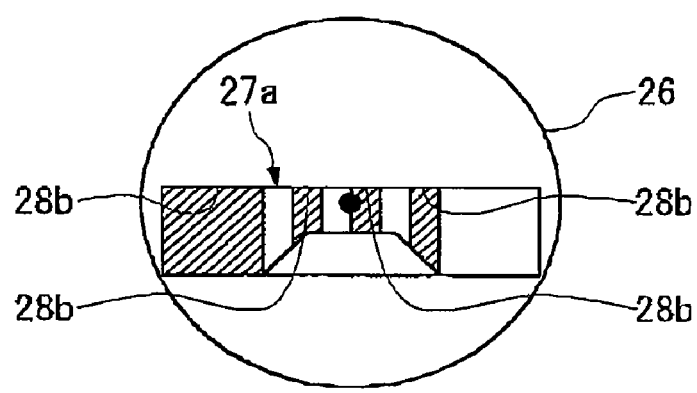
Figure 6C:
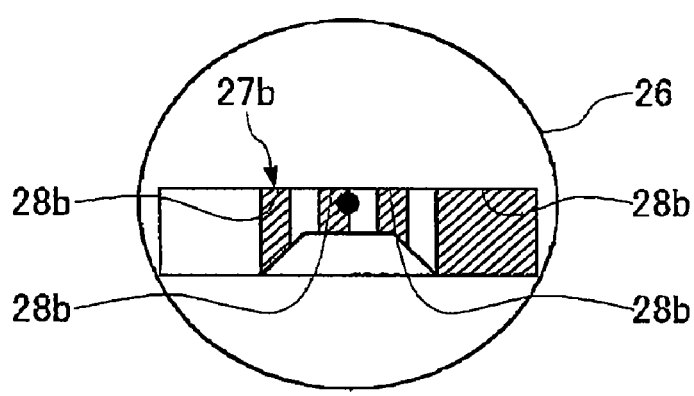
Figure 6D:
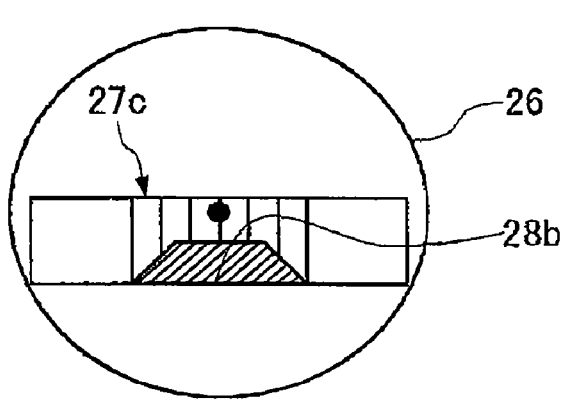

FIGS. 5A-5D illustrate the shape and location of the front end beam outlets 28b in the light source units 27a, 27b, and 27c according to a variation. In the case of FIGS. 5A-5D, a portion of a high beam illumination area 40 is vertically divided into a plurality of blocks. More specifically, the high beam illumination area is divided into three vertically separated blocks in a zone corresponding to the vicinity of the vertical line V on the hypothetical vertical screen. The illustrated example also requires that the horizontal width is greater toward the top of the high beam illumination area. Thus, lower regions 40a having a smaller horizontal width are formed in the lowermost block in the vicinity of the horizontal line H on the hypothetical vertical screen where oncoming vehicles or pedestrians are likely to be found, i.e., the portion corresponding to the first regions 38a of FIG. 4A, thereby allowing for meticulous on and off illumination control. The upper blocks of the high beam illumination area 40 are located away from the horizontal line H on the hypothetical vertical screen and are characterized by less likelihood that oncoming vehicles or pedestrians are found. Therefore, second regions having a greater horizontal width than the first regions are formed in the upper blocks to allow simple on and off illumination control. In other words, by using middle regions 40b and upper region 40c for illumination, the chance of securing a sufficient field of view in front of the vehicle is increased by using a part of the high beam function. In the case of FIG. 5A, the region configured as one of the second region in FIG. 4A is further divided into two so as to provide middle regions 40b. The horizontal width of the middle regions 40b is ensured to be greater than that of the lower regions 40a, i.e., the first regions, and smaller than that of the upper region 40c. By further partitioning at least one of the second regions into the middle regions 40b and upper region 40c, more meticulous illumination control for reduction of glare can be achieved than in the structure of FIG. 4A. In other words, a larger portion of the high beam illumination area is ensured to remain turned on to produce a high beam, which helps securing a sufficient field of view for the driver.

FIGS. 6A-6D illustrate the shape and location of the front end beam outlets 28b in the light source units 27a, 27b, and 27c according to another variation. In the case of FIGS. 6A-6D, a portion of a high beam illumination area 42 is vertically divided into a plurality of blocks, as in FIGS. 5A-5D. More specifically, the high beam illumination area is divided into two vertically separated blocks in a zone corresponding to the vicinity of the vertical line V on the hypothetical vertical screen. The illustrated example also requires that the horizontal width of the upper block of the high beam illumination area is ensured to be greater that of the lower block. It should be noted, however, that, while the shape of the second region 38c shown in FIG. 4A and the shape of the upper region 40c shown in FIG. 5A constituting the second regions are rectangular, the second region 42b shown in FIG. 6A has a trapezoidal shape. The trapezoidal shape is above an area on the hypothetical vertical screen shown in FIGS. 3A-3D where the eyes move trying to catch oncoming vehicles or pedestrians. As such, the trapezoid matches the shape of the region in which it is considered unnecessary to reduce glare. In other words, where the high beam illumination area 42 is divided into a plurality of vertically separated blocks including first regions 42a and the second region 42b, glare as experienced by oncoming vehicles or pedestrians is efficiently reduced by turning off one of the first regions 42a in the lower block. In other words, by using the second region 42b for illumination, the chance of securing a sufficient field of view in front of the vehicle is increased by using a part of the high beam function.

Figure 7:
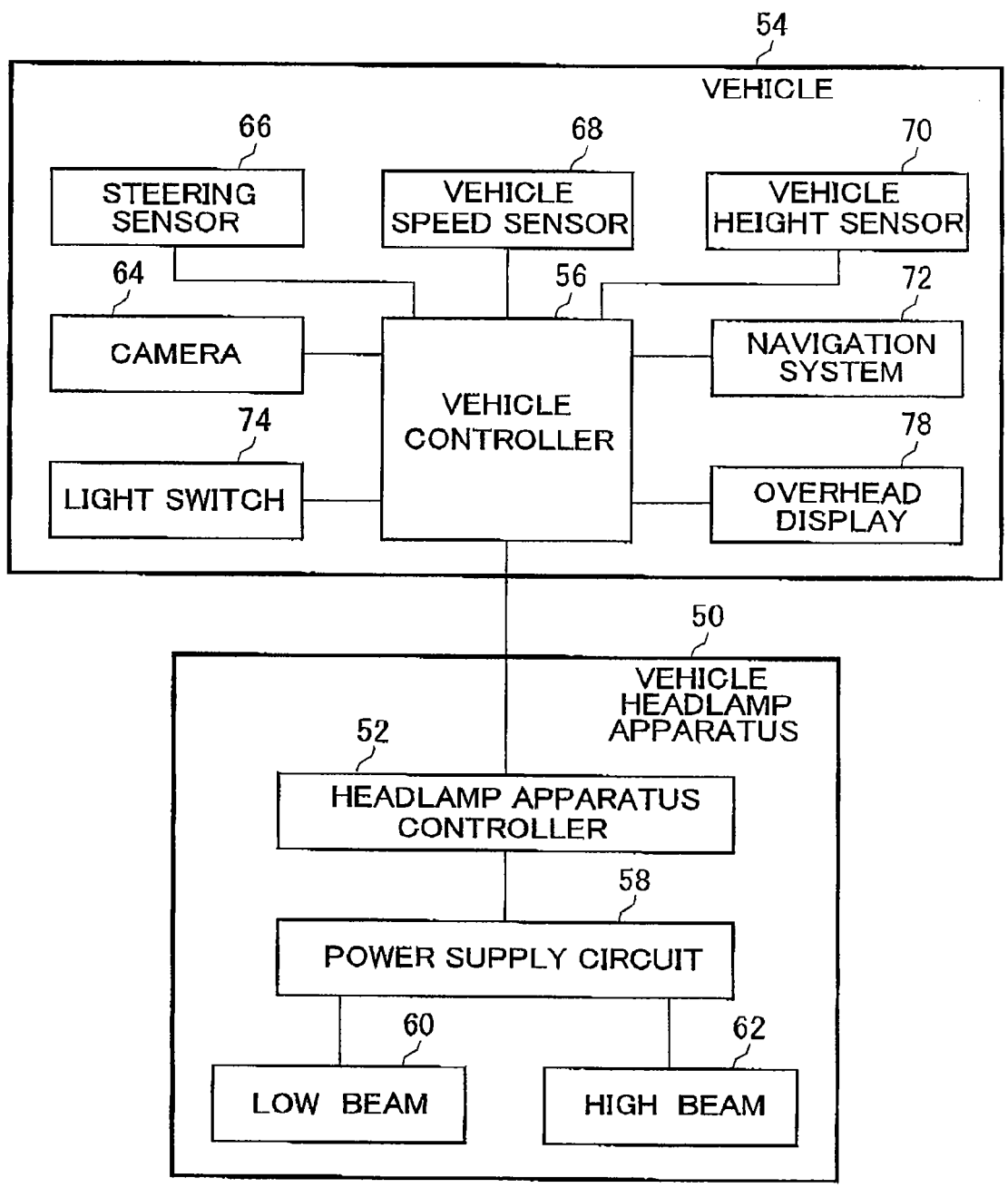
FIG. 7 is a functional block diagram showing the structure of a headlamp apparatus controller of the automotive headlamp apparatus and of a vehicle controller of a vehicle.

FIG. 7 is a functional block diagram showing the structure of a headlamp apparatus controller of the automotive headlamp apparatus 50 and of a vehicle controller of the vehicle incorporating the structure described above. A headlamp apparatus controller 52 of an automotive headlamp apparatus 50 controls a power supply circuit 58 according to an instruction from a vehicle controller 56 installed in a vehicle 54 and subjects the bulb 22 for a low beam 60 or light emitting devices for a high beam 62 to illumination control.

In the case of the embodiment, when an object that requires reduced illumination is found in the high beam illumination area while the low beam 60 and high beam 62 are being turned on, the portion of the high beam illumination area corresponding to the location occupied by the object is turned off. Objects that require reduced illumination include oncoming vehicles, vehicles in front, or pedestrians that may experience a glare. In order to control the portion to be turned off, the vehicle controller 56 uses image data supplied from a camera 64 (e.g. a stereo camera) used as a means for detecting the object. The imaging area of the camera 64 substantially matches the area of the hypothetical vertical screen. If an image captured by the camera contains feature points indicating a vehicle or pedestrian stored in advance, it is determined that an object that requires reduced illumination is located in the high beam illumination area. Information is provided to the headlamp apparatus controller 52 so as to turn off the light emitting devices forming an illumination area corresponding to the location occupied by the object that requires reduced illumination. As mentioned before, objects that require reduced illumination in the high beam illumination area are likely to be located in the first regions of the high beam illumination area corresponding to the vicinity of the horizontal line H. Therefore, the light emitting devices forming the first regions are mainly subject to illumination control. Means for detecting an object that requires reduced illumination in the high beam illumination area may be changed. Instead of the camera 64, other detecting means such as a millimeter-wave cloud radar or an infrared radar may be used. Alternatively, a combination of different detecting means may be employed.

The vehicle controller 56 may obtain information from a steering sensor 66, a vehicle speed sensor 68, or a vehicle height sensor 70, which are normally installed in the vehicle 54. The controller 56 may perform illumination control of the first and second regions in accordance with the condition of driving or orientation of the vehicle 54. For example, when it is found that vehicle is turning based on the information from the steering sensor 66, the vehicle controller 56 may automatically perform illumination control of the first and second regions so that the field of view in the direction of turning is improved. Such a control mode will be referred to as turn-sensitive mode. Further, when a vehicle is driven at a high speed at night, it is preferable that the headlamp is turned on for illumination to ensure that oncoming vehicles or vehicles in front approaching from far ahead, traffic signs, or message boards are noticed as early as possible. In this regard, the vehicle controller 56 automatically turns on the second regions when it is found that the vehicle is driven at a high speed based on the information from the vehicle speed sensor 68, thereby improving the distant view. Such a control mode will be referred to as speed sensitive mode. The vehicle height of the vehicle 54 changes depending on the number of people on board, weight on board, or acceleration or deceleration. The vehicle may be inclined forward or backward depending on the acceleration or deceleration. In association with the variation in vehicle height, the light axis is shifted vertically. For example, when the light axis is shifted upward, oncoming vehicles or pedestrians may not experience a glare even if the first regions are turned on to produce illumination. When the light axis is shifted downward, oncoming vehicles or pedestrians may experience a glare even by the illumination from the second regions. The vehicle controller 56 may be configured to address this by accurately keeping track of the orientation of the vehicle 54 based on the information from the vehicle height sensor 70 along with the information from the camera 64 so as to perform illumination control of the first and second regions more properly. Such a control mode will be referred to as vehicle height sensitive mode.

In addition, the vehicle controller 56 may obtain information on the pattern and formation of the road or information on traffic signs from a navigation system 72. Obtaining such information in advance will enable illumination control of the first and second regions suitable for the road being traveled, ensuring smooth and proper high beam illumination. Such a control mode will be referred to as navigation sensitive mode.

The vehicle controller 56 is connected to a light switch 74 operated by the driver. The light switch 74 is a manually operated switch to turn on and off the low beam 60, and to turn on and off the high beam 62 while the load beam 60 is being turned on. As mentioned before, the vehicle controller 56 may automatically perform illumination control of the low beam 60 or the high beam 62 in accordance with the conditions surrounding the vehicle, condition of driving or orientation of the vehicle 54, or whether there are oncoming vehicles or pedestrians, irrespective of whether the light switch 74 is operated. Such a control mode will be referred to as automatic high beam mode.

The light distribution pattern projected by the above-described illumination area formed by the headlamp apparatus controller 52 will be explained in detail with reference to FIG. 8, which shows an image of the pattern.

Figure 8:
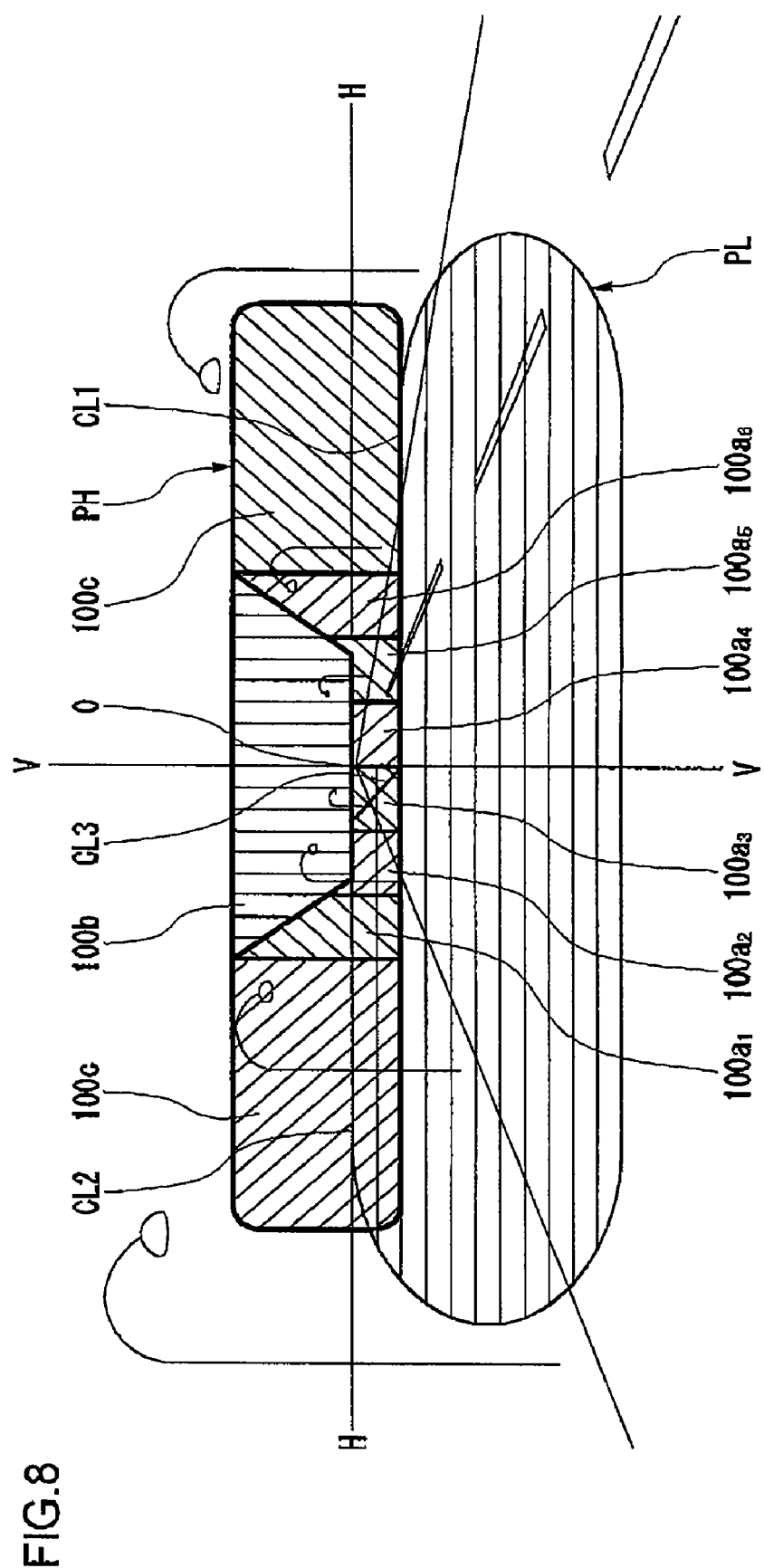
FIG. 8 shows a light distribution pattern projected by an illumination area formed by the vehicle headlamp apparatus according to the embodiment.

FIG. 8 is a transparent view of a low beam distribution pattern PL and a high beam distribution pattern PH formed by projecting the illumination area formed by the vehicle headlamp apparatus 10 onto a position in front of the vehicle (e.g., onto the hypothetical vertical screen set up about 25 m ahead).

As mentioned before, the low beam distribution pattern PL has a distinct bright-dark border, i.e., a cut-off line, that defines the upper limit of the light distribution. The cut-off line marks a border between a bright area below the cut-off line and a dark area above the cut-off line. For example, the cut-off line of an automotive headlamp apparatus of a vehicle for left-hand traffic includes a right portion CL1, a central portion CL3, and a left portion CL2. The right portion CL1, extending horizontally below the horizontal line passing through the light axis on the right side of the vehicle, and the left portion CL2, extending horizontally slightly above the right portion on the left side of the vehicle, are joined by the central portion CL3 inclined upward to the left. The inclination of the central portion is, for example, 45°. As mentioned before, oncoming vehicles, vehicles in front, or pedestrians are located in the vicinity of the intersection of the vertical line V and the horizontal line H and in the vicinity of the horizontal line H on the hypothetical vertical screen. Accordingly, when only a low beam that forms the low beam distribution pattern PL having the above-mentioned cut-off line is used, it is possible to reduce glare as experienced by oncoming vehicles, vehicles in front, or pedestrians.

The high beam distribution pattern PH shown in FIG. 8 is a light distribution pattern formed by projecting the high beam illumination area shown in FIG. 6. Substantially the central portion of the light distribution pattern is divided into upper and lower blocks, creating a second light distribution pattern 100$b$ of a trapezoidal shape and first light distribution patterns 100$a$1-100$a$6 located below the second light distribution pattern 100$b$ and having a smaller horizontal width than the second light distribution pattern 100$b$. Of the first light distribution patterns 100$a$1-100$a$6 of the embodiment, the first light distribution patterns 100$a$1, 100$a$2, 100$a$5, and 100$a$6 are formed to include hypotenuses aligned with the hypotenuses of the trapezoidal shape of the second light distribution pattern 100$b$. Further, the patterns 100$a$1, 100$a$2, 100$a$5, and 100$a$6 have a larger area than the first light distribution patterns 100$a$3 and 100$a$4 near the intersection O of the vertical line V and the horizontal line H. As mentioned before, the apparent size, on the hypothetical vertical screen, of an oncoming vehicle or pedestrian located in the vicinity of the intersection O grows as the vehicle or pedestrian approaches the driver's vehicle. Accordingly, the size of the first light distribution patterns 100$a$ is increased in steps from the center toward the sides so as to adapt to the variation in the apparent size of an oncoming vehicle or pedestrian as it approaches the driver's vehicle. By variably sizing the first light distribution patterns, the number of times that the light sources are required to be turned off for reduction of glare is reduced. In other words, on and off illumination control of the first regions is simplified. If the size of an oncoming vehicle or pedestrian detected by, for example, the camera 64 is larger than the size of one of the first light distribution pattern 100$a$, on and off illumination control of the first regions may be performed such that a plurality of first light distribution patterns 100$a$ are simultaneously turned off.

As shown in FIG. 8, the end light distribution patterns 100$c$ at the ends of the high beam distribution pattern PH are not divided into a plurality of blocks. As can be seen in FIG. 8, the end light distribution patterns 100$c$ are a region characterized by less likelihood that oncoming vehicles or pedestrians are located, as in the case of the second light distribution pattern 100$b$. Therefore, the end light distribution patterns 100$c$ are assumed not to require being frequently turned on and off while a high beam is being used and so is subject to simplified on and off control. The end light distribution patterns 100$c$ may be integrated with the second light distribution pattern 100$b$ so as to form a single second region subject to illumination control.

A description will be given of a procedure for controlling the automotive headlamp apparatus 10 configured to form such light distribution patterns.

When the vehicle controller 56 detects that the light switch 74 is operated indicating that the driver requests the low beam 60 be turned on, the controller 56 supplies an instruction requesting the headlamp apparatus controller 52 to turn the low beam 60 on. The headlamp apparatus controller 52 controls the power supply circuit 58 according to the instruction thus received so as to supply a predetermined voltage to the low beam lamp unit 16 to turn the low beam 60 on and create a low beam illumination area. The low beam distribution pattern PL as shown in FIG. 8 is projected so as to secure a sufficient field of view for the driver by the low beam 60 illumination.

When the light switch 74 is operated while the low beam 60 is being turned on so that the vehicle controller 56 receives an instruction to turn the high beam 62 on, the vehicle controller 56 supplies an instruction requesting the headlamp apparatus controller 52 to turn the high beam 62 on. The headlamp apparatus controller 52 controls the power supply circuit 58 according to the instruction thus received so as to supply a predetermined voltage to the high beam lamp units 18 to turn the high beam 62 on and create a high beam illumination area. The high beam distribution pattern PH as shown in FIG. 8 is projected so as to secure a sufficient field of view for the driver by the high beam 62 illumination.

In this process, the vehicle controller 56 obtains, at least from the camera 64, information related to an image on the hypothetical vertical screen in front of the vehicle 54 and supplies the information thus obtained to the headlamp apparatus controller 52. Upon obtaining the information from the camera 64 via the vehicle controller 56, the headlamp apparatus controller 52 determines whether an object that requires turning off a part of the high beam distribution pattern PH is found in the information. This is to determine whether an object, such as an oncoming vehicle, vehicle in front, or pedestrian, that requires reduction of glare is found in the information obtained. A well known method may be employed for detection of an object. For example, feature points indicating the features of an ongoing vehicle, vehicle in front, or pedestrian may be stored in advance. If the information obtained by the camera 64 contains feature point information, it is determined that a target object is located in the high beam distribution pattern PH. The power supply circuit 58 is controlled so as to turn a portion of the high beam 62 off, i.e., to turn off a high beam illumination area corresponding to the portion in the high beam distribution pattern PH occupied by the object. As a result, glare as experienced by the object is reduced. Such a control mode will be referred to as glare reduction mode for high beam illumination. In this case, those first regions that project at least one of the first distribution patterns 100a1-100a6 will be primarily turned off. In the case of an oncoming vehicle or pedestrian, the relative distance between the driver's vehicle traveling and the object changes. As the object approaches driver's vehicle, the object moves leftward or rightward along the horizontal line H on the hypothetical vertical screen. The headlamp apparatus controller 52 is capable of detecting the movement of the object by referring to the information from the camera 64 and so selects from the first distribution patterns 100a1-100a6 according to the movement of the object and sequentially turns off the selected patterns. As a result, glare as experienced by the oncoming vehicle, vehicle in front, or pedestrian is reduced even if the high beam 62 is turned on. Further, distant areas where glare reduction is not a concern continues to be illuminated brightly by the high beam 62. Consequently, the field of view is properly secured for the driver.

Meanwhile, the area illuminated by the second light distribution pattern 100b is characterized by less likelihood that objects that requires reduction of glare, such as oncoming vehicles, vehicles in front, or pedestrians, are located and so do not require frequent on and off control. The second light distribution pattern 100b illuminates an overhead sign region above the horizontal line H on the hypothetical vertical screen. An overhead sign region is defined as a region where there are objects that should desirably be noticed by the driver while driving (e.g., traffic signs located above the horizontal line on the hypothetical vertical screen set up at, for example, 25 m ahead of the vehicle). An overhead sign region is defined about 2°-4° above the horizontal line. Thus, according to the automotive headlamp apparatus 10 of the embodiment, areas to be illuminated for the driver to perceive traffic signs, etc. continues to be brightly illuminated to secure sufficient field of view for the driver, while reducing glare as experienced by an object. Such a control mode will be referred to as overhead sign region detection mode.

The above description assumes that the driver operates the light switch 74 to turn the high beam 62 on. Alternatively, the high beam 62 may be automatically turned on for illumination control directed to reduction of glare, irrespective of whether the light switch 74 is operated.

Still alternatively, in association with the turning on of the low beam 60, only the second region of the high beam 62 may be additionally turned on, providing only the second light distribution pattern 100b for illumination. In this case, the overhead sign region only vaguely illuminated by the low beam 60 in the related art is illuminated brightly by using a part of the high beam function. Therefore, the front view is improved for the driver regardless of the presence of oncoming vehicles, vehicles in front, or pedestrians. In other words, the upper portion of the hypothetical vertical screen where information useful for the driver abounds can be illuminated brightly. In this case, glare as experienced by oncoming vehicles, vehicles in front, or pedestrians is reduced because the first regions are turned off. Since the second region remain turned on in association with the turning on of low beam illumination and does not require meticulous illumination control, illumination control is simplified. Illumination by the second region may be turned on automatically in association with the turning on of low beam illumination. Alternatively, only the second region may be turned on according to the driver's operation.

Thus, according to the embodiment, glare as experienced by oncoming vehicles, vehicles in front, or pedestrians is reduced even when a high beam is used for illumination. Therefore, a high beam can be used where it has not been frequently used in the related art (e.g., on city streets) without being serious concerned about the outcome. Thus, the function of the automotive headlamp apparatus can be fully taken advantage of.

Further, when a vehicle is driven at a high speed on a road exclusively for vehicles (e.g. a highway), bright distant illumination is desired. The embodiment addresses such a need by allowing only some of the first regions of the high beam 62 to be turned on. By turning on the first regions so as to project only the first light distribution patterns 100a3 and 100a4 of FIG. 8 located toward the center, illumination control for illuminating areas characterized by the need for securing sufficient field of view during high-speed driving is possible. In other words, illumination control in a motorway mode is possible. In this case, areas requiring illumination are minimally illuminated so that lighting control that meets energy saving requirements is achieved. Since the motorway mode is achieved only by turning on selected first regions of the high beam 62, glare as would be experienced by oncoming vehicles is reduced.

Figure 9A:
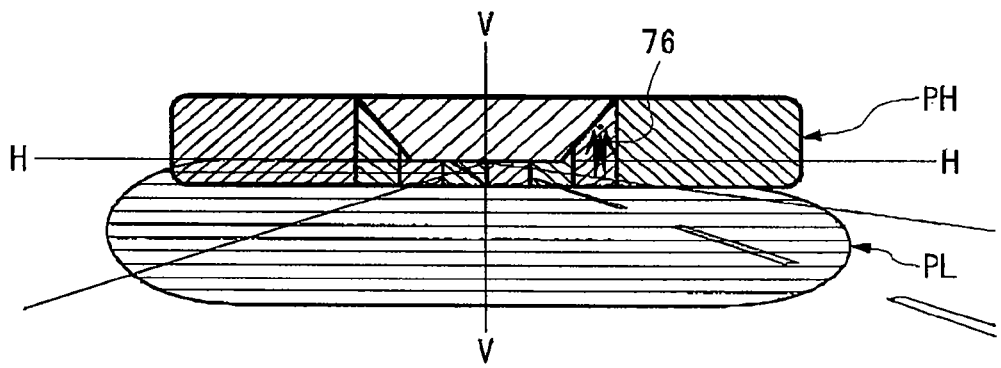
FIGS. 9A-9D show superimposing an image onto a portion not illuminated by the automotive headlamp apparatus according to the embodiment.
Figure 9B:
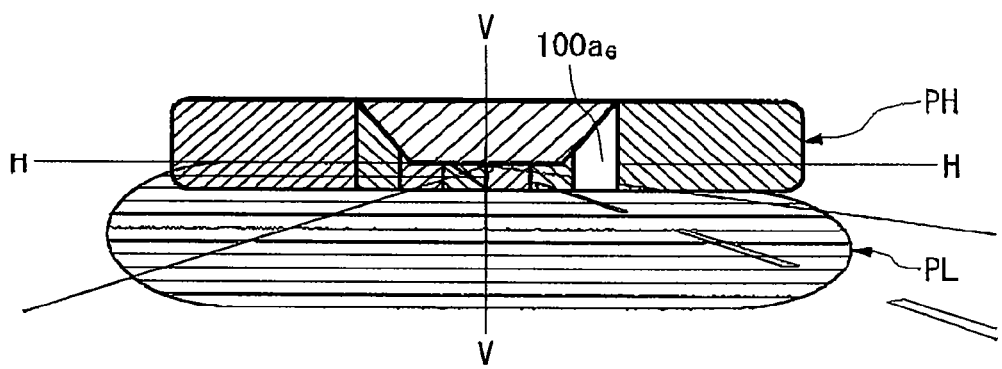
Figure 9C:
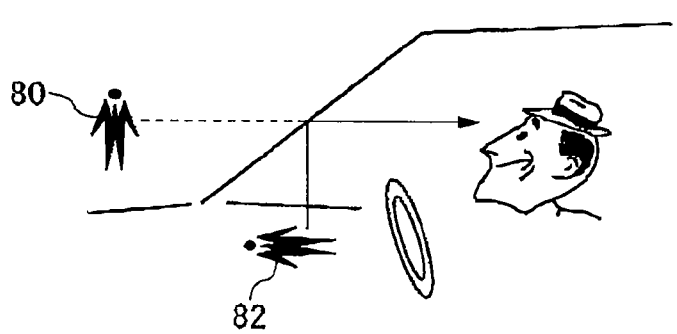
Figure 9D:
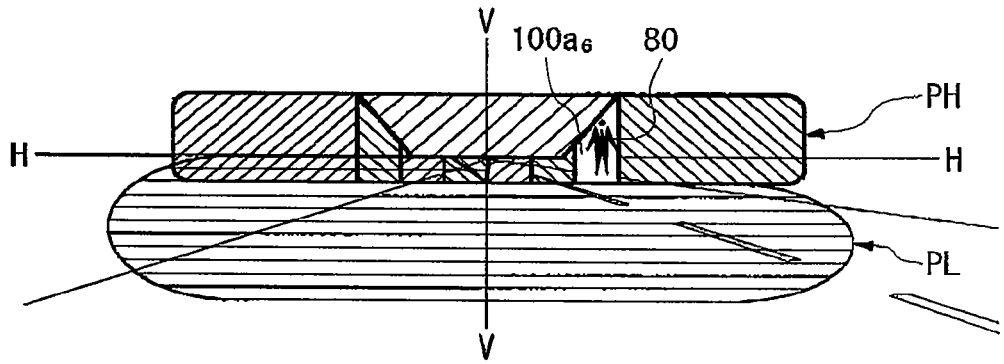

In the event that an object 76 (e.g., a pedestrian) that requires reduced illumination is located in the high beam distribution pattern PH, as in FIG. 9A, illumination control is performed whereby only the first light distribution pattern 100a6 corresponding to the location occupied by the object 76 is turned off, as shown in FIG. 9B. Accordingly, the location would stand out in the view of the driver, looking like a black hole in the background of brightly illuminated area. The illumination is turned off because the object 76 requiring such a measure is located there and so can let know the presence of some object there. However, the driver may feel uneasy if it is difficult to know what is there. The embodiment addresses the concern by using an overhead display 78 (see FIG. 7) or the like to superimpose an image 82, indicating the presence of the object 76, in the direction to be illuminated by the first region 42a turned off, i.e., in the direction of the first light distribution pattern 100a6 as viewed from the driver. A real image (the object 76) obtained when noticing the object 76 may be used as it is as an image 80 superimposed on the hypothetical vertical screen. Alternatively, an image of a pedestrian or vehicle may be created based on a real image obtained. Still alternatively, selection may be made from images prepared based on results of detecting the object 76 so that the selected image is superimposed. The image displayed on the overhead display 78 may not correspond to the actual pedestrian or vehicle. For example, the image may be a mark or character that draws the attention of the driver. As mentioned before, the apparent size of the object 76 grows as it approaches the driver's vehicle. When the image 80 corresponding to the object 76 is displayed on the overhead display 78, the driver may feel disturbed if the size of the image 80 does not change in association with the change in the object size. Varying the image 80 on a realtime basis would also impose a heavy load for image processing. Meanwhile, by using a mark or character for the image 80, the driver will be less likely to feel disturbed even if the size or sharpness thereof remains unchanged. Using a mark or character also has an advantage of letting the driver know the presence of the object 76 using image processing that is easy to perform. It would help draw the driver's attention if the display of the image 80 is complemented by making an announcement such as "there is a pedestrian in an area without light" in a manner that the driver does not feel bothered. The control mode wherein the image 80 is displayed or an announcement is output will be referred to as an object detection mode.

Formation of the high beam distribution pattern PH by combining the first light distribution patterns and the second light distribution pattern is described above by way of example. In other words, a plurality of high beam lamp units 18 are described as being used to form a high beam illumination area by combining the first and second regions. In contrast, a single high beam lamp unit is used in the example shown in FIG. 10.

Figure 10:
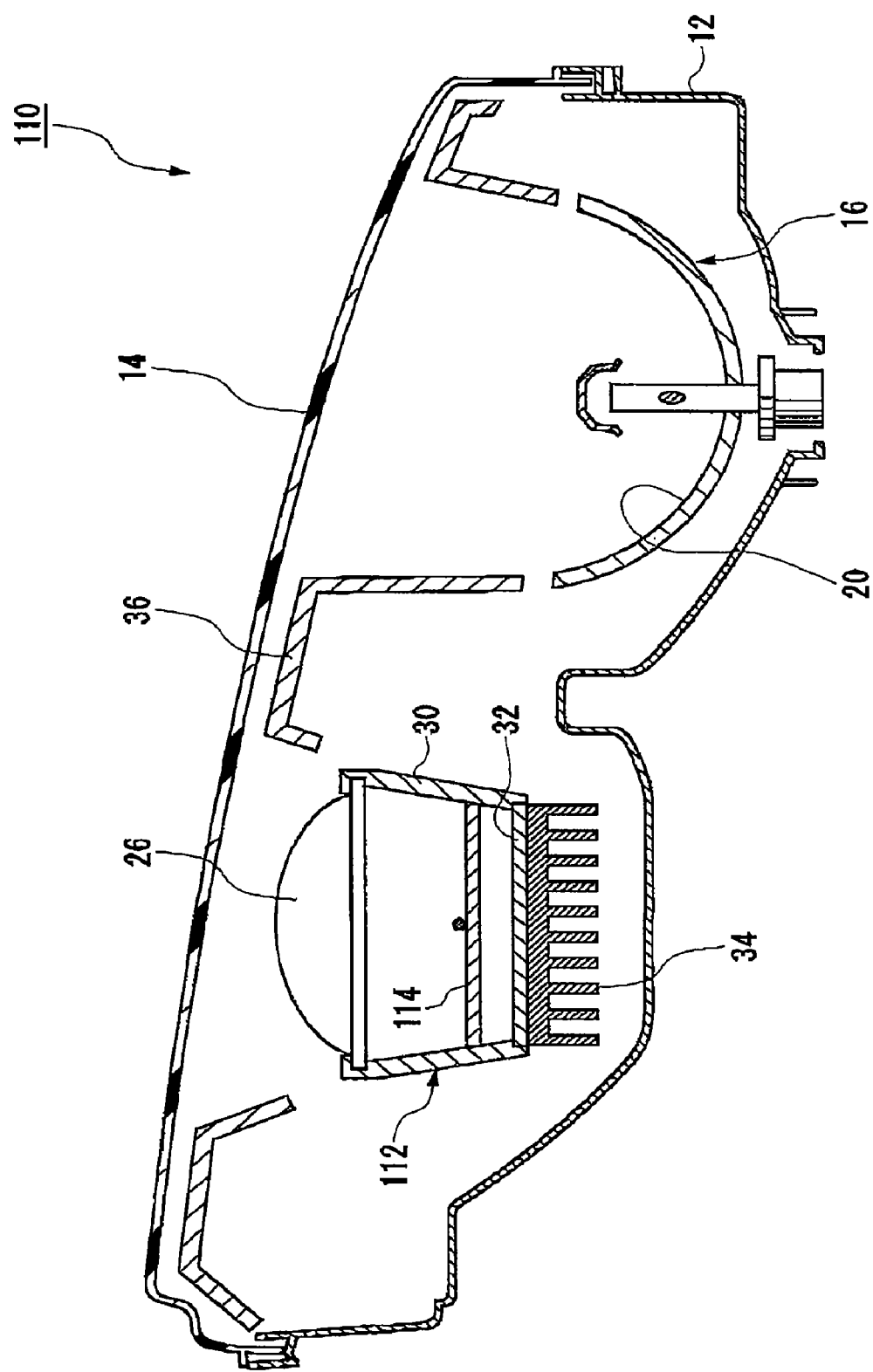
FIG. 10 is a schematic diagram showing an alternative structure of the automotive headlamp apparatus according to the embodiment.

An automotive headlamp apparatus 110 shown in FIG. 10 comprises a single low beam lamp unit 16 and a single high beam lamp unit 112. The aspects of the structure other than the high beam lamp unit 112 may be the same as those of the automotive headlamp apparatus 10 shown in FIG. 1. Therefore, like numerals represent like components and the description thereof is omitted.

The lamp body 12 and the transparent cover 14 of the automotive headlamp apparatus 110 form a substantially sealed space. Inside the space are provided a single low beam lamp unit 16 and a single high beam lamp unit 112. The low beam lamp unit 16 and the high beam lamp unit 112 form illumination areas projecting predefined light distribution patterns onto a hypothetical vertical screen located at the distance of, for example, 25 m ahead on a traffic road and including a vertical line V and a horizontal line H.

Figure 11:
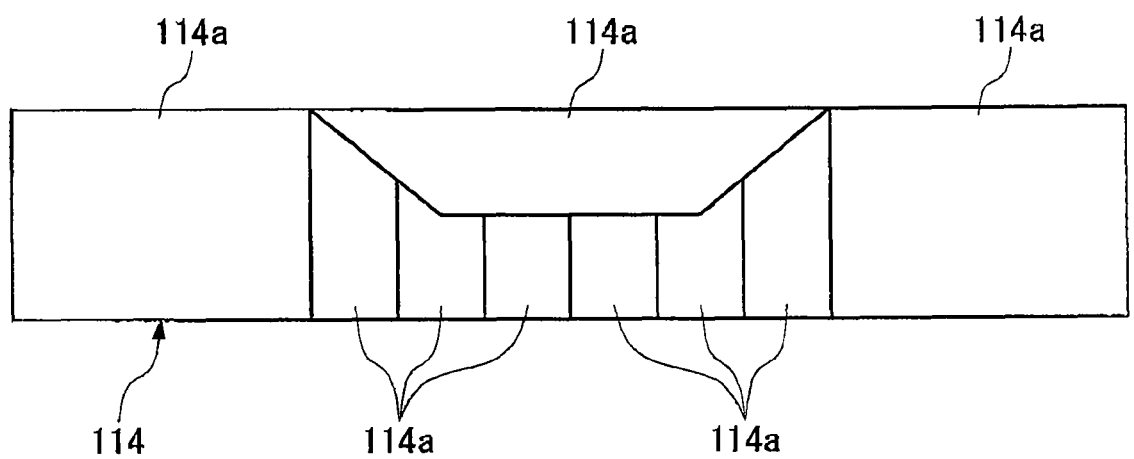
FIG. 11 shows an example of a shielding member used in the automotive headlamp apparatus of FIG. 10.

The high beam lamp unit 112 comprises a projection lens 26 and a holder 30. The holder 30 holds the projection lens 26 at its front and supports at its back a device substrate 32 connected to a heat sink plate 34. One or a plurality of light emitting devices are provided on the device substrate 32. Between the projection lens 26 and the device substrate 32 is provided a shielding member 114 that selectively shields light emitted from the device substrate 32 so as to ensure that only a desired light distribution pattern is prevented from being projected as shown in FIG. 9B. For example, a liquid crystal filter may be used as the shielding member 114. FIG. 11 shows an example of a shielded region 114a formed by the shielding member 114. The shielded region 104a may comprise substantially the same shapes as the first regions 42a and the second region 42b formed by the front end beam outlets 28b of the light source units 27a, 27b, and 27c shown in FIG. 6. For example, to prevent a portion of the high beam distribution pattern PH from being projected as shown in FIG. 9B for reduction of glare, the shielding member 114 may be controlled to form the corresponding shielded region 114a. If a liquid crystal filter is used as the shielding member 114, a shielded portion may be formed easily by voltage control. In this case, devices on the device substrate 32 need not be turned off for reduction of glare and may remain turned on while a high beam is being used. Thus, extra control of the light emitting sources is not necessary and the light sources are controlled easily in a mode when the high beam is turned on. If a liquid crystal filter is used as the shielding member 114, the shape of the shielded area may be arbitrarily configured. Therefore, illumination areas as shown in FIGS. 4A and 5A are easily formed. In other words, illumination areas adapted for the usage are formed.

In describing the structure shown in FIGS. 1 and 2A-2C, a high beam illumination area is assumed to be produced by using a plurality of light source units 27 as combined, by way of example. Alternatively, the light source units 27 may be omitted so that light emitting devices having the shapes of the first and second regions may be directly provided on the device substrate 32. This has an advantage of simplifying the structure of the high beam lamp unit 18. Such an approach will, however, likely produce a border line between elements of respective shapes. Therefore, it is desirable that a light emitting device or filter be provided as needed for reduction or prevention of a border line.

A single high beam lamp unit 18 and three high beam lamp units 18 are described as forming the high beam illumination area according to the embodiment. The number of high beam lamp units 18 is arbitrary and may be appropriately selected in accordance with the number of first and second regions to be formed, while still providing the same advantage as the embodiment as described.

The high beam illumination is described as being divided into two or three vertically separated blocks. The number of partitions may be changed as needed. The number of partitions in the width direction may also be changed as needed. By dividing the portion of the high beam illumination area where an object is likely to be found into smaller illuminated regions, more meticulous control for prevention of glare can be performed.

The embodiment described above is non-limiting and it will be obvious to those skilled in the art that various modifications could be developed based upon the knowledge of a skilled person. The components shown in the drawings are intended to be illustrative only and may be modified as needed and still provide the same advantage, provided that the components achieving the same function are used.

What is claimed is:

1. An automotive headlamp apparatus comprising:
   a light source for producing a high beam; and
   a controller for controlling the illumination from the light source, wherein given that at least a portion of a high beam illumination area illuminated by the light source is vertically divided into a plurality of blocks, the controller controls illumination from the light source such that a plurality of first regions having a predetermined horizontal width are formed at least in some of the blocks toward the bottom, and that a second region having a greater horizontal width than the first regions is formed in the block toward the top, and wherein the controller is operative to control illumination from the light source such that when an object that requires reduced illumination is found in the high beam illumination area, the portion of the high beam illumination area corresponding to the location occupied by the object is turned off.

2. The automotive headlamp apparatus according to claim 1, wherein
the controller controls illumination from the light source such that the first and second regions are formed so as to include the vicinity of the center of the high beam illumination area illuminated by the light source.

3. The automotive headlamp apparatus according to claim 1, wherein
the controller controls illumination from the light source such that the high beam illumination area corresponds to an overhead sign region.

4. The automotive headlamp apparatus according to claim 1, wherein
the controller turns on the second region while a low beam is being turned on so as to add to the low beam.

5. The automotive headlamp apparatus according to claim 3, wherein
the controller turns on the second region while a low beam is being turned on so as to add to the low beam.

6. The automotive headlamp apparatus according to claim 1, wherein
the controller turns on the vicinity of the center of the first regions while a low beam is being turned on so as to add to the low beam.

7. The automotive headlamp apparatus according to claim 1, wherein
the controller controls illumination from the light source such that the size of the first regions is increased in steps from the center toward the sides.

8. The automotive headlamp apparatus according to claim 1, wherein
the light source comprises a plurality of individual light sources adapted to form the first and second regions individually, and
the controller produces the high beam illumination area by individually controlling the individual light sources.

9. The automotive headlamp apparatus according to claim 1, wherein
the controller controls, when a vehicle is turning, illumination from the light source such that the first and second regions are formed in the direction of turning.

10. The automotive headlamp apparatus according to claim 1, wherein
the controller controls illumination from the light source such that the first and
second regions are formed in accordance with the forward or backward inclination of a vehicle.

11. The automotive headlamp apparatus according to claim 1, wherein
the controller controls illumination from the light source such that the first and second regions are formed in accordance with information obtained from a navigation system or a camera.

12. The automotive headlamp apparatus according to claim 1, wherein
the controller controls illumination from the light source such that the end portions of the high beam illumination area are integrated with the second region.

13. The automotive headlamp apparatus according to claim 1, wherein
the controller forms the first and second regions by using a liquid crystal filter to variably shield light from the light source.

14. A method of controlling an automotive headlamp apparatus for controlling illumination from a light source for producing a high beam, comprising:
vertically dividing at least a portion of a high beam illumination area illuminated by the light source into a plurality of blocks;
controlling illumination from the light source such that a plurality of first regions having a predetermined horizontal width are formed at least in some of the blocks toward the bottom, and that a second region having a greater horizontal width than the first regions is formed in the block toward the top; and
when an object that requires reduced illumination is found in the high beam illumination area, the portion of the high beam illumination area corresponding to the location occupied by the object is turned off.

15. The method according to claim 14, wherein
an image indicating the presence of the object is displayed superimposed in the direction, as viewed from the driver, to be illuminated by the region turned off.

16. The method according to claim 15, wherein
when the image is displayed superimposed, an audio announcement is made to let know that the object that requires reduced illumination is found.

* * * * *